United States Patent [19]
Betere

[11] 3,827,112
[45] Aug. 6, 1974

[54] METHOD FOR THE CONTINUOUS PRODUCTION OF NEEDLED MULTI-PLY MATERIALS

[75] Inventor: Antonio Betere, Madrid, Spain

[73] Assignee: Fabricas Lucia Antonia Betere, S.A., Madrid, Spain

[22] Filed: July 19, 1973

[21] Appl. No.: 380,813

Related U.S. Application Data

[62] Division of Ser. No. 112,319, Feb. 3, 1971, Pat. No. 3,755,863.

[52] U.S. Cl.............................................. 28/72.2 R
[51] Int. Cl............................................. D04h 18/00
[58] Field of Search .... 28/4 R, 4 N, 72.2 R, 72.2 F; 156/148; 161/80, 81

[56] References Cited
UNITED STATES PATENTS

| | | | |
|---|---|---|---|
| 1,863,269 | 6/1932 | Fox | 161/80 X |
| 2,036,766 | 4/1936 | McDermott | 28/4 R |
| 3,360,421 | 12/1967 | Sands | 28/72.2 R X |
| 3,451,885 | 6/1969 | Klein | 28/72.2 R X |
| 3,613,190 | 10/1971 | Crosby | 28/72.2 R X |

*Primary Examiner*—Robert R. Mackey
*Attorney, Agent, or Firm*—Woodhams, Blanchard and Flynn

[57] ABSTRACT

A method for the continuous production of composite multi-ply material intended for use in mattress making, for upholstery and the like. The method includes combining a sheet of foamed material with a sheet of textile material to form the multi-ply web, needling the multi-ply web to cause securement of the individual sheets together and cutting of the needled, multi-ply web into predetermined lengths. The needling is effected by initially penetrating both the center and edge portions of the web and subsequently by penetrating, at selected intervals, strips extending transversely across the web with the needle penetrating density at the edge portions and transverse strips being higher than the penetration density in the center portion of the web. The cutting is effected by transversely cutting the web along the needled strips.

1 Claim, 3 Drawing Figures

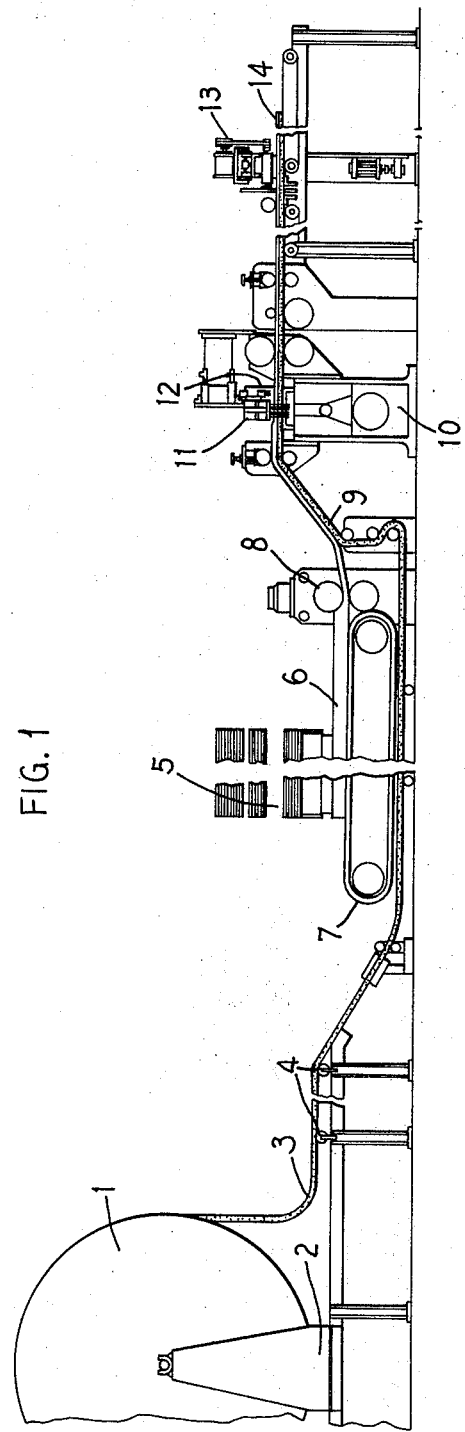

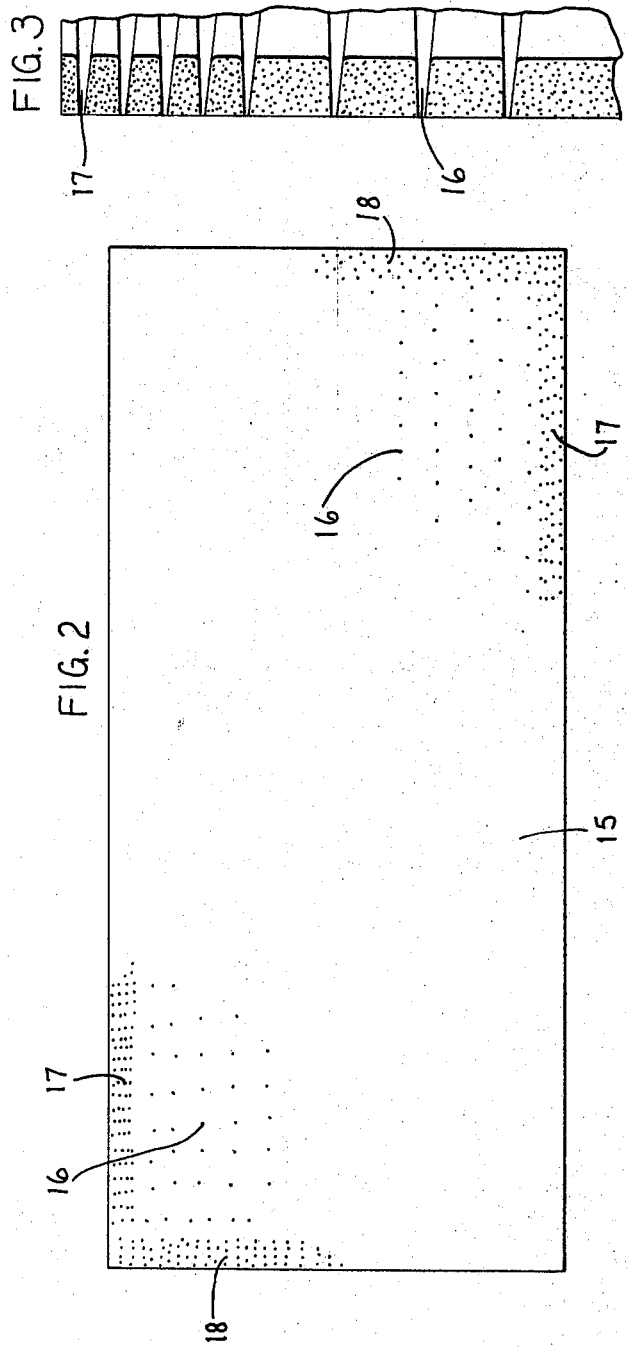

METHOD FOR THE CONTINUOUS PRODUCTION OF NEEDLED MULTI-PLY MATERIALS

CROSS REFERENCE TO RELATED APPLICATION

This application is a division of my copending application Ser. No. 112,319, filed Feb. 3, 1971, now U.S. Pat. No. 3,755,863, granted Sept. 4, 1973.

The present invention relates to improvements in and to installations for the continuous manufacture of composite backing materials for upholstery goods and the like, and in particular, to an improved form of installation for making a composite, multi-ply material for use in mattresses.

It is already known to use in the manufacture of mattresses, blankets of multi-ply material arranged between the top and bottom planes of the springs and the outer cover or case thereof, in order to obtain a greatly more comfortable assembly. Among the materials most suitable for such use are those consisting of a sheet of spongy or foam material permanently joined on one or both sides to a fleece or layer of textile fibers, preferably cotton wadding or batting either by glueing or by needling, the latter being the most secure method of joining a fleece to a sheet of foamed material such as polyurethane, since glueing does not prevent loosening of the textile fibers farthest from such polyurethane sheet.

However, such known forms of needling do not ensure any joining of the two materials at their edges which would satisfactorily resist the forces applied to the multi-ply sheet during the making of such a mattress.

Consequently, the object of this invention is to overcome this drawback by appreciably increasing the density of the needling in the parts of the continuous strip of multiply material which will form the edges of the said assembly.

The improvements forming the object of the present invention will be more clearly apparent from the description now following in conjunction with the drawings, wherein:

FIG. 1 is a diagrammatic elevation of an installation for the continuous production of a multi-ply material incorporating the improvements according to the present invention;

FIGS. 2 and 3 are views in plan and end elevation, respectively, showing the distribution of the holes in a multi-ply material produced in an installation according to FIG. 1 showing the different density obtained by this method in the edge parts of such a material.

In FIG. 1, the stock roll or cylinder 1 carries a continuous strip of porous material 3, such as foamed polyurethane, and rotates in guides 2. The continuous strip or web 3 is conveyed by rollers 4 or equivalent conveying means to the feed system for the textile material, preferably of cotton, shown at 5 in the drawings and the intake end whereof incorporates means for removing any foreign matter which may be held in the textile fibers.

After forming the layer of textile fibers 6, the latter is transferred by an endless conveyor belt 7 to the pressure rollers 8 which receive this layer and form it into a uniform fibrous fleece.

Upon leaving the pressure rollers 8 the two sheets 3 and 6, of porous material and of textile fiber, respectively, are joined at 9 and then proceed to the penetration stage which is performed in a machine 10 equipped with needle heads 11 which introduce the fleece 6 of textile fibers into the sheet 3 of polyurethane material.

The needle head 11 carries an arrangement of needles wherein the needles which penetrate the center portion of the web are more widely spaced apart than the needles disposed for penetrating the edge portions of the web. This results in a higher penetration density in the edge regions of the continuous web of multi-ply material, while the provision of the auxiliary needle head 12 treats the material transversely and at selected intervals at a penetration density similar to that existing at the edges of the web.

In these regions, the denser treatment across the web is applied at intervals to suit the lengths into which the continuous, multi-ply web is subsequently to be parted. These periodic cuts are made with a cross-cutting device shown at 13 in FIG. 1, consisting simply of a conventional saw of known kind, the cutting periods of which are predetermined according to requirements. Finally, the installation has an end stage for the discharge of the blankets, shown at 14, where the latter arrive already cut to the preselected lengths required and subjected to a needling process by uniformly spaced needles in their central parts and with a closer treatment density at the edges.

The effect of the variable needle density on the apparatus of the present invention is clearly illustrated in FIGS. 2 and 3, wherein FIG. 2 diagramatically illustrates a multi-ply sheet 15 of predetermined length after same has been cut from the web by the cutting device 13. The center portion of the sheet 15 has been needled by the head 11 resulting in the formation of the openings or penetrations 16 which are spaced a substantial distance apart, which openings 16 are of a low penetration density per square unit of area of the sheet 15. However, since the head 11 has a substantially higher concentration of needles disposed for engaging the opposite edges, these needles result in the formation of a plurality of closely adjacent openings or penetrations 17 along the opposite edges of the sheet 15, which openings 17 have a high penetration density per unit area of the sheet. Further, since the auxiliary head 12 also has a large number of closely spaced needles thereon, the auxiliary head 12 also results in the transverse edges of the sheet 15, due to the cutting of the sheet, having a large number of penetrations 18 formed therealong. The penetrations 18 are also of a high density per unit area so that the penetrations 18 along the transverse edges are thus similar to the density of the penetrations 17 as formed along the longitudinally extending edges of the sheet. Thus, the penetration density adjacent all of the edges is thus substantially greater than the penetration density of the center portion of the sheet, thereby providing a much more secure interconnection of the two sheets due to the high density needling along the longitudinally and transversely extending edges.

Obviously, the installation according to the present invention can treat a continuous web of any required width and can be modified in its details such as the spacing of the roll bearings 2 as well as the needle heads 11, 12 which determine the maximum density at the edges of the said multi-ply web.

What I claim is:

1. An improved process for securely interconnecting a plurality of overlapping sheets by needling for increasing the resistance to separation of the multi-ply material thus formed, comprising the steps of:

providing a first sheet of a flexible porous material;

providing a second sheet in the form of a fleece of fibers;

positioning said first and second sheets in superimposed and overlapping relationship to form a continuous composite multi-ply web;

penetrating the center portion of said continuous web with a plurality of needles to form in said center portion a pattern of holes having a first density per unit area of said web;

penetrating the edge portions of said web with a plurality of needles to form in said edge portions a pattern of holes having a second density per unit area substantially greater than said first density;

penetrating at selected intervals a strip extending transversely across the continuous web with a plurality of needles to form in said transverse strip a pattern of spaced holes having a third density per unit area substantially greater than said first density; and transversely cutting said continuous web along a line extending through said transverse strips to form sheets of predetermined length.

* * * * *